April 11, 1950 A. E. BACHELET 2,503,371

SELECTIVE SIGNALING SYSTEM

Filed Feb. 21, 1949 2 Sheets-Sheet 1

INVENTOR
A. E. BACHELET
BY J W Schmied
ATTORNEY

FIG. 2
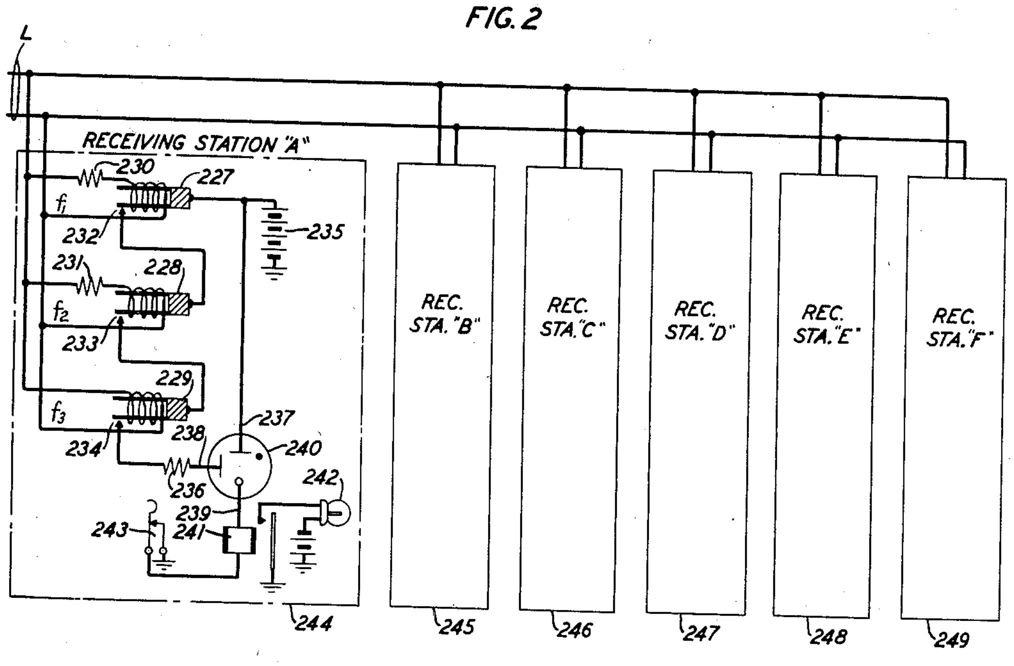
FIG. 3
| SEQUENCE OF APPLICATION | SUGGESTED DURATION | STATION CODES | | | | | |
|---|---|---|---|---|---|---|---|
| | | A | B | C | D | E | F |
| 1 | 1.0 | $f_1$ | $f_1$ | $f_2$ | $f_2$ | $f_3$ | $f_3$ |
| 2 | .6 | $f_2$ | $f_3$ | $f_1$ | $f_3$ | $f_1$ | $f_2$ |
| 3 | .2 | $f_3$ | $f_2$ | $f_3$ | $f_1$ | $f_2$ | $f_1$ |
FIG. 4
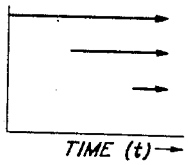
INVENTOR
A. E. BACHELET
BY J W Schmied
ATTORNEY Patented Apr. 11, 1950

2,503,371

UNITED STATES PATENT OFFICE 2,503,371

SELECTIVE SIGNALING SYSTEM

Albert E. Bachelet, New York, N. Y., assignor to Bell Telephone Laboratories, Incorporated, New York, N. Y., a corporation of New York Application February 21, 1949, Serial No. 77,570

9 Claims. (Cl. 177—353)

Figure 1:
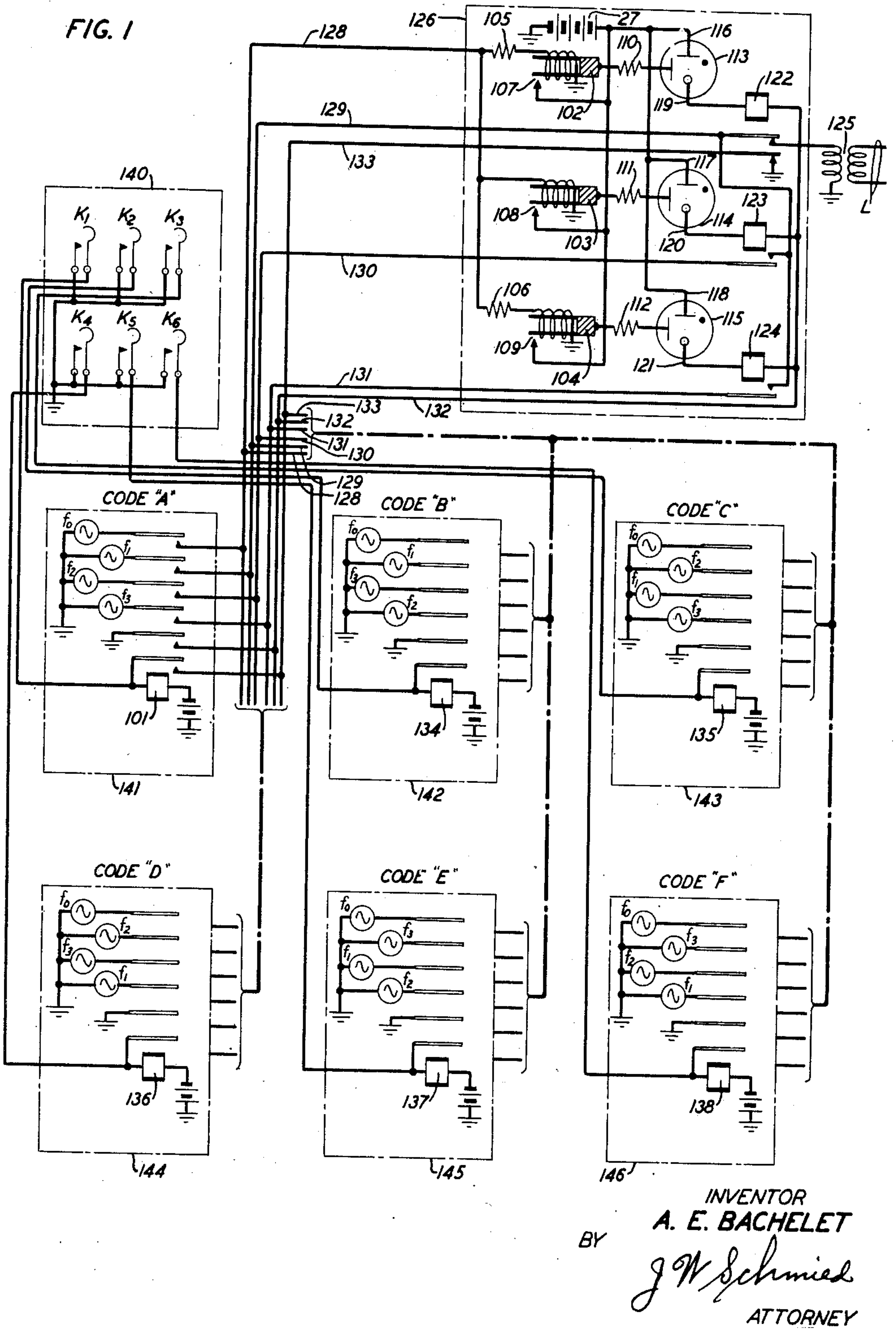

This invention relates to signaling systems and more particularly to such systems in which voice frequency currents are used for the transmission of calling signals. The preferred embodiment of the invention herein disclosed contemplates the application of the invention to selective signaling of party line stations in telephone transmission systems. From the following disclosure however, it will be apparent that the invention may be employed for selective calling of stations in a radio network, or any other communication system wherein a plurality of stations are interconnected by a common transmission medium.

In voice frequency signaling systems of the general class to which the present invention relates, one serious problem which must be solved is the avoidance of false ringing due to the presence of speech currents or any extraneous electrical disturbance in the system. The present invention minimizes this hazard while providing an improved arrangement for fully selective calling of party line telephone stations employing selected voice frequencies for signaling purposes.

The invention employs tuned reed relays of the general type disclosed by copending applications of H. C. Harrison, Serial No. 776,251, filed September 26, 1947, now Patent No. 2,499,581 and Serial No. 776,252, filed September 26, 1947, at both the calling and the called stations. The reed relays used in the present invention may differ from each other not only in their natural frequency response but also in their time response characteristics so that greater selectivity may be attained by employing a coding system in which the duration of signal pulses, as well as the frequency of such signals, is selectively controlled. In this arrangement each signal from the calling station comprises a number of tones of different frequencies, each tone being applied to the transmission medium at a different starting time, the first tone applied continuing until all of the succeeding tones have been applied, and the plurality of tones thus continuing concurrently for a carefully measured time interval sufficient to produce simultaneous operation of corresponding tuned reed relays in the particular receiving station which is being called.

It is well known that the frequency response of tuned reed relays may be varied by changing the size of the vibrating member, or by loading the vibrator in any one of a number of ways. A copending application of H. C. Harrison, Serial No. 767,487, filed August 8, 1947, discloses a selective signaling system in which reed relays, so tuned to respond to different frequencies, are actuated simultaneously to establish a calling condition. In the present invention, a second variable is introduced into the selective system of Harrison by controlling the time response as well as the frequency response characteristics of tuned reed selectors in a selective signaling circuit. The time response of such selectors may be controlled by varying the stiffness of the vibrators, the degree of damping, or the magnitude of operating current which is allowed to flow through the relay driving coils.

One of the objects of this invention is to provide a signaling system operating on the basis of time selectivity as well as frequency selectivity.

Another object of the invention is to provide an improved arrangement for accurately controlling time delays in a switching circuit.

Still other objects and advantages of the invention will be apparent from the following description taken in connection with the accompanying drawings in which:

Fig. 1 is a schematic diagram of a signal transmitting station connected to transmission line L, the other end of which line is connected to a plurality of receiving stations. The apparatus included within block 126 of Fig. 1 represents the time delay switching control portion of the transmitting circuit. Block 140 represents the operator's switchboard control position having six keys, $K_1$ through $K_6$, respectively, of a type whose contacts close momentarily upon operation. The switching relays 101, 134, 135, 136, 137 and 138 enclosed within the separate blocks 141, 142, 143, 144, 145 and 146 are connected to a plurality of different frequency signal sources, $f_0$, $f_1$, $f_2$ and $f_3$, as illustrated, and may be individually operated by momentary closure of one of the keys $K_1$ to $K_6$, respectively, to connect the signal sources to various portions of the time delay circuit whereby the signaling tones are applied to the transmission line L in different orders for signaling any one of six receiving stations on the line;

Fig. 2 shows receiving stations, A, B, C, D, E and F connected across the common transmission line L. The circuit of receiving station A is shown in detail. The circuits of stations B to F enclosed within blocks 245 to 249 are identical with the circuit of station A within block 244, the only distinction being in the time response characteristics of the different receiving station selector circuits;

Fig. 3 shows the order of connecting frequency generators $f_1$, $f_2$ and $f_3$ to signal any one of the six receiving stations A to F interconnected by the same line. Fig. 3 also indicates the relative duration of the frequency signals required for calling each station; and Fig. 4 represents graphically the time characteristics for three calling signals applied sequentially, continuing concurrently, and terminating simultaneously at the end of a measured interval.

From the detailed description which follows it will be apparent to anyone skilled in the art that by increasing the number of signal generators like $f_1$, $f_2$ and $f_3$ at the transmitting station, the number of receiving stations on the line L may be indefinitely increased.

Referring now in greater detail to the drawing Fig. 1, we will trace the operations involved in signaling the receiving station A of Fig. 2. To call station A, the corresponding signaling key $K_1$ of Fig. 1 is momentarily operated. This operates relay 101 which locks to ground under the control of the lower back contact of relay 122. Relay 101 operated also connects ground to the winding of relays 122, 123 and 124. A tone from the signal generator $f_0$ is now connected to the mechanically tuned reed relays 102, 103 and 104 respectively, all of which are tuned to vibrate at the same frequency $f_0$, causing them to be energized and to close their respective contacts 107, 108 and 109. By controlling the operating currents of relays 102, 103 and 104 in such manner that each of these relays has a different time response, contacts 107, 108 and 109 can be made to close in any desired order. Thus by equipping relays 102 and 104 with current limiting resistances 105 and 106 selected of such values that the current flowing in the winding of tuned reed relay 103 is greater than the current flowing in the winding of tuned reed relay 104, and the current flowing in the winding of tuned reed relay 104 is greater than the current flowing in the winding of tuned reed relay 102, relays 103, 104 and 102 may be made to close contacts 108, 109 and 107 in that sequence. As a result of the inequality of current flowing in the windings of relays 102, 103 and 104, tones from signal generators $f_1$, $f_2$ and $f_3$ are applied to the transmission line L in a definite order of sequence and for a definite time of duration, as represented by the graph of Fig. 4.

The manner in which this is accomplished is as follows: Tone from signal generator $f_1$ is applied to the line L at a time when relay 101 operates upon closure of key $K_1$. Subsequently, tuned reed relay 103 operates and closes its contact 108 which ionizes gas tube 114 and in turn operates relay 123. Operation of relay 123 connects tone from signal generator $f_2$ to the transmission line. Subsequent to the operation of tuned reed relay 103, relay 104 operates closing its contact 109 which causes gas tube 115 to ionize and operate relay 124. Operation of relay 124 connects tone from signal generator $f_3$ to the transmission line so that now all three tones of frequencies $f_1$, $f_2$ and $f_3$ are being transmitted over the line, as represented by the graph of Fig. 4. At the end of the signaling interval, tuned reed relay 102 operates closing contact 107 which ionizes gas tube 113 and in turn operates relay 122. Operation of relay 122 disconnects tone from signal generators $f_1$, $f_2$ and $f_3$ from transmission line L and releases relay 101 by opening the locking ground which had been previously connected through the lower contact of relay 122. The release of relay 101 opens the cathode circuits of gas tubes 113, 114 and 115 causing these tubes to deionize and thereby releasing relays 122, 123 and 124. Release of relays 122, 123 and 124 restores the circuit of Fig. 1 to normal idle condition. Thus after key $K_1$ is released, another selection can be made and another station signaled by operation of a different key.

From the above discussions, it will be obvious that any form of sensitive relay device may be substituted for the gas discharge tubes 113, 114 and 115. However, for simplicity of circuit design, it is recommended that gas-filled tubes of a type generally similar to those disclosed by Patent No. 1,784,869, granted to F. Gray, December 16, 1930, be employed for this purpose.

Referring now to Fig. 2 of the drawings, we will trace in detail the sequence of operations which occur when the signals represented by Fig. 4 are received at receiving station A. The three distinct signal tones $f_1$, $f_2$ and $f_3$ which, as we have just seen, were successively applied to the line L by the calling station of Fig. 1, having with respect to each other the time relationship represented by Fig. 4, are received at station A by tuned reed relays 227, 228 and 229. Since these tuned reed relays have frequency and time response characteristics corresponding to code A of Fig. 3, which was the code transmitted from the calling station in Fig. 1, contacts 232, 233 and 234 of reed relays 227, 228 and 229 respectively, will close at the same time. This results from the fact that tuned reed relays 227, 228 and 229 are tuned to frequencies $f_1$, $f_2$ and $f_3$ respectively, and their operating times differ in exactly the same manner that the duration of tones $f_1$, $f_2$ and $f_3$ differ. As shown in Fig. 2, the time characteristics of the respective tuned reed relays are controlled by series resistances 230 and 231 in the same manner that resistances 105 and 106 of Fig. 1 served to control the time constants of relays 102 and 104 therein. Thus, relays 227 and 228 in Fig. 2 are connected to resistances 230 and 231, respectively, which serve to limit the currents in these relay windings so that the magnitude of signaling current flowing in relay 228 is greater than the magnitude of signaling current flowing in relay 227 but less than the current flowing in relay 229. The values of resistances 230 and 231 are such that relay 227 takes longer to operate than relay 228 which in turn takes longer to operate than relay 229, and thus when signaling tones $f_1$, $f_2$ and $f_3$ timed as illustrated by Fig. 4 are applied to the line L in the order represented, contacts 232, 233 and 234 of relays 227, 228 and 229 close simultaneously. When this occurs a circuit is closed from battery 235 through contacts 232, 233 and 234 and current limiting resistance 236 to the control anode 238 of gas-filled tube 240. Since the cathode 239 of gas tube 240 is connected to ground through key 243 and relay 241, ionization of the tube 240 will result causing relay 241 to operate and turn on indicating signal lamp 242. Key 243 at the receiving station may be a switch-hook contact, which when operated removes ground from relay 241, deionizing gas tube 240 and extinguishing signal lamp 242. Of course it will be obvious that a bell or other suitable indicating device may be substituted for the indicating lamp represented by 242.

It is assumed that receiving stations B, C, D, E and F which are bridged across the line L, will not respond to the particular sequence of signal tones to which station A responds because every other station on the line is adapted to respond to a distinctive combination of signal tones transmitted in different time sequence relationship in accordance with a distinct code for each station. Thus for any other combination of signal tones as listed in the chart of Fig. 3, the contacts of relays 227, 228 and 229 will not close simultaneously and therefore indicating lamp 242 will not be operated.

Although the tuned reed relays herein represented are assumed to have equal values of Q, and in the circuits herein disclosed suitably selected resistances are connected in series with the driving coils of the various tuned reed relays as means for controlling the magnitude of the respective tuned reed operating currents, thereby regulating the relative differences in response time of the several relays, it is to be understood that similar circuit performance may be obtained by the use of tuned reed relays having unequal values of Q but with equal values of relay operating current applied to their respective driving coils. Furthermore, it will be apparent that the time constant of the respective tuned reed relays may be controlled by varying both parameters, i. e., employed reeds having different values of Q and at the same time employing resistances of different values to limit the operating current through the various relays, without departing from the spirit or principle of the invention.

What is claimed is:

1. A signaling system comprising a calling station and a plurality of outlying stations interconnected by a common transmission medium, a plurality of signal tones of different frequencies at said calling station, a time delay circuit for applying said tones to said transmission medium in differently timed increments according to a predetermined code, and selective receiving means at each of said outlying stations adapted to respond to said signal currents as received in a particular combination of differently timed increments for each station.

2. A signaling system comprising a calling station and a plurality of outlying stations interconnected by a common transmission medium, a plurality of signal tones of different frequencies at said calling station, a time delay circuit for applying said signal tones to said transmission medium in differently timed increments according to a predetermined code, and selective receiving means at each of said outlying stations comprising a plurality of tuned circuits adapted to respond to signal tones of particular frequencies and different incremental periods of duration in accordance with a distinctive code for each station.

3. A signaling system comprising a calling station and a plurality of outlying stations interconnected by a common transmission medium, a plurality of signal tones of different frequencies at said calling station, a time delay arrangement comprising a plurality of reed relay circuits each having different time constants so adapted to apply said signal tones to said transmission medium at successive intervals of time and to interrupt transmission of all of said signal tones after a measured interval of time, and selective receiving means at each of said outlying stations adapted to respond to said signal tones when received in a particular combination of differently timed increments for each station.

4. A signaling system comprising a calling station and a plurality of outlying stations interconnected by a common transmission medium, a plurality of signal tones of different frequencies at said calling station, a time delay arrangement comprising a plurality of reed relay circuits each having different time constants and adapted to apply said signal tones to said transmission medium at successive intervals of time and to further interrupt transmission of all of said signal tones after an elapsed time interval, and selective receiving means at each of said outlying stations comprising a plurality of tuned reed relay circuits adapted to respond to signal tones of particular frequencies and different incremental periods of duration in accordance with a distinctive code for each station.

5. A signaling system comprising a calling station and a plurality of outlying stations interconnected by a common transmission medium, a plurality of signal tones of different frequencies at said calling station, a plurality of frequency responsive time delay circuits comprising a plurality of reed relay circuits, said reed relay circuits having different time constants according to a prearranged code, a plurality of switching means for connecting said signal tones to said reed relay time delay circuits in a different order for each switching means, selective receiving means at each of said outlying stations comprising a plurality of tuned reed relay circuits corresponding in frequency and time response characteristics to said reed relay time delay circuits at said calling station, and indicating means at each of said outlying stations operable by reception thereat of a signal comprising a plurality of tones corresponding in frequency and time duration to the selective characteristics of said tuned reed relay circuits thereat.

6. In a signaling system, a time delay arrangement comprising a plurality of tuned reed relay circuits having different time response characteristics, a plurality of alternating currents of different frequencies, switching means for simultaneously applying said alternating currents to said reed relay circuits, further relay means responsive to successive operation of said tuned reed relay circuits and adapted to apply said alternating currents to a transmission line at successive intervals determined by the time response characteristics of said individual tuned reed relay circuits, and further means for interrupting the transmission of all of said alternating currents after the lapse of a measured time interval.

7. In a signaling system, a transmitting station, comprising means for generating a plurality of signal tones of different frequencies, a number of time delay circuits each comprising a plurality of tuned reed relays adapted to respond to one of said signal tones at different intervals determined by the different time constants of said reed relays, selective switching means for applying said signal tones to said time delay circuits in a selected order, and further switching means operable by said reed relays to apply a combination of said signal tones to a transmission line in a particular order and for a limited interval of time as determined by the time constant of said delay circuits.

8. In a signaling system, a receiving station, comprising a plurality of tuned reed relays having predetermined time and frequency response characteristics such that different periods of energization are required for operation of each of said reed relays, a further relay means adapted to be operated only upon simultaneous operation of all of said tuned reed relays, and call indicating means controlled by operation of said further relay means.

9. In a selective signaling system, a plurality of receiving stations interconnected by a common transmission medium, each of said stations comprising a group of tuned reed relay circuits having different time and frequency response characteristics in accordance with a prearranged code for each station, further relay means at each station responsive to simultaneous operation of all of said tuned reed relay circuits at said station, and call indicating means operable by response of said further relay means to simultaneous operation of all of said tuned reed relay circuits at said station, and call indicating means operable by response of said further relay means to simultaneous operation of said tuned reed relay circuits upon reception at any of said stations of a call signal comprising currents of distinctive frequencies and particular time durations corresponding to the frequency and time response characteristics of all of said tuned reed relay circuits at said receiving station.

ALBERT E. BACHELET.

REFERENCES CITED

The following references are of record in the file of this patent:

UNITED STATES PATENTS

| Number | Name | Date |
|---|---|---|
| 2,149,355 | Lundstrom | Mar. 7, 1939 |
| 2,403,561 | Smith | July 9, 1946 |
| 2,437,326 | Lewis | Mar. 9, 1948 |